(12) United States Patent
Müller et al.

(10) Patent No.: US 11,590,958 B2
(45) Date of Patent: Feb. 28, 2023

(54) METHOD FOR DETECTING UNDESIRABLE VIBRATIONS OF AN ACTUATOR OF AN ELECTROMECHANICAL BRAKE, ELECTRONICALLY CONTROLLED BRAKING SYSTEM, COMPUTER PROGRAM PRODUCT, CONTROL UNIT AND MOTOR VEHICLE

(71) Applicant: ZF Active Safety GmbH, Koblenz (DE)

(72) Inventors: Andreas Müller, Gamlen (DE); Ralf Kinder, Kadenbach (DE)

(73) Assignee: ZF Active Safety GmbH, Koblenz (DE)

(*) Notice: Subject to any disclaimer, the term of this patent is extended or adjusted under 35 U.S.C. 154(b) by 318 days.

(21) Appl. No.: 17/080,278

(22) Filed: Oct. 26, 2020

(65) Prior Publication Data
US 2021/0122353 A1    Apr. 29, 2021

(30) Foreign Application Priority Data
Oct. 24, 2019 (DE) .......................... 102019128744.8

(51) Int. Cl.
*B60T 17/22* (2006.01)
*G01M 17/007* (2006.01)
(Continued)

(52) U.S. Cl.
CPC ............. *B60T 17/221* (2013.01); *B60Q 9/00* (2013.01); *B60T 8/17* (2013.01); *G01M 17/007* (2013.01); *B60T 2270/406* (2013.01)

(58) Field of Classification Search
CPC . B60Q 9/00; B60T 17/221; B60T 8/17; B60T 2270/406; B60T 8/885;
(Continued)

(56) References Cited

U.S. PATENT DOCUMENTS

| 2001/0043450 | A1* | 11/2001 | Seale | H02N 15/00 361/160 |
| 2014/0196994 | A1* | 7/2014 | Schneider | B60T 17/221 188/161 |
| 2018/0347530 | A1* | 12/2018 | Le | F02N 11/084 |

FOREIGN PATENT DOCUMENTS

| DE | 10026125 A1 | 11/2001 |
| DE | 10051783 A1 | 4/2002 |

* cited by examiner

*Primary Examiner* — Tyler J Lee
*Assistant Examiner* — Yufeng Zhang
(74) *Attorney, Agent, or Firm* — Robert James Harwood (57) ABSTRACT

A method for detecting undesirable vibrations of an actuator of an electromechanical brake includes the steps of: (1) providing an electrical signal comprising at least one piece of information about a current consumption of the actuator or a parameter correlated with the current consumption; (2) monitoring an operation of the actuator on the basis of the gradient of the electrical signal in such a way that after switching on the actuator and preferably after a subsequent delay time, which includes determining: whether the amount of an initial instantaneous value of the gradient exceeds the amount of a threshold and whether a subsequent second instantaneous value of the gradient has an inverted sign compared to the first instantaneous value; (3) evaluating the results to ensure that an undesirable vibration is assessed as detected the aforementioned conditions are met.

13 Claims, 3 Drawing Sheets

(51) Int. Cl.
*B60T 8/17* (2006.01)
*B60Q 9/00* (2006.01)

(58) Field of Classification Search
CPC ...... B60T 8/173; B60T 17/22; G01M 17/007; F16D 2066/005
See application file for complete search history.

METHOD FOR DETECTING UNDESIRABLE VIBRATIONS OF AN ACTUATOR OF AN ELECTROMECHANICAL BRAKE, ELECTRONICALLY CONTROLLED BRAKING SYSTEM, COMPUTER PROGRAM PRODUCT, CONTROL UNIT AND MOTOR VEHICLE

CROSS-REFERENCE TO RELATED APPLICATION

This application claims priority to German Patent Application No. 102019128744.8 filed Oct. 24, 2019, the disclosure of which is incorporated herein by reference in its entirety.

TECHNICAL FIELD

The present disclosure relates to a method for detecting undesirable vibrations of an actuator of an electromechanical brake. The present disclosure also relates to an electronically controlled braking system for a motor vehicle, a computer program product, a control unit, and a motor vehicle.

BACKGROUND

Electronically controlled braking systems increasingly have an electromechanical brake and are, for example, a component in motor vehicles. The electromechanical brake is used there, for example, as a holding brake to keep the motor vehicle at a standstill, for example when the motor vehicle is on an inclined road. The electromechanical brake usually uses an electric motor to drive, for example, an actuating piston by which a brake disc is actuated while exerting a braking force.

SUMMARY

One object of the present disclosure is to propose at least one way to improve the previous concept of an electronically controlled braking system with an electromechanical brake.

The object is achieved with a method for detecting undesirable vibrations of an actuator of an electromechanical brake, which has the features of claim 1. To solve the problem, an electronically controlled braking system with the features of claim 10, a computer program product with the features of claim 14, a control unit with the features of claim 15 and a motor vehicle with the features of claim 16 are proposed. Advantageous embodiments and/or designs and/or aspects of the present disclosure result from the subordinate claims, the following description, and the figures.

A basic method for detecting undesirable vibrations of an actuator of an electromechanical brake, for example of a motor vehicle or for a motor vehicle, involves the step in which an electrical signal is provided, which includes at least information about a current consumption of the actuator or a parameter correlated with the current consumption.

The term "current consumption" means in particular the electrical current absorbed by the actuator in the present description. In particular, therefore, it is the electrical current which flows to the actuator, for example during its operation. For example, the operation of the actuator includes an actuation process of the electromechanical brake, for example, to clamp or open the electromechanical brake. The term "current consumption" can be understood as an instantaneous current consumption. For example, the respective instantaneous current consumption results in a time profile. For example, the time profile describes the current consumption of the actuator in order to achieve a desired clamping force or braking force of the electromechanical brake. The current consumption may be associated with an actuator and/or an electric motor or other electrical actuation device of the actuator, for example to actuate an actuating piston acting on a brake jaw while exerting a clamping force or braking force.

The electrical signal can be an analog signal or a digital signal. In particular, the electrical signal has a time profile. For example, the electrical signal is a current signal. The electrical signal can be a control signal for controlling the electrical current, which is fed to the actuator. Also, the electrical signal may directly relate to the electrical current that flows to the actuator to operate the electromechanical brake, in particular to actuate it.

In one embodiment, the method further includes the step in which an operation of the actuator is monitored on the basis of the electrical signal. In particular, the operation of the actuator is monitored on the basis of the gradient of the electrical signal in such a way that, for example, after switching on the actuator and preferably after a subsequent delay time, in particular it is continuously checked whether i) the value of a first instantaneous value of the gradient exceeds the value of a threshold and in particular ii) a second instantaneous value of the gradient preferably following in time has an inverted sign compared to the first instantaneous value. In particular, the method also includes the step in which the test is evaluated in such a way that an undesirable vibration is assessed as detected if at least the criteria (i) and (ii) are met.

The term "gradient of the electrical signal" is to be understood in the present description in particular as a change in the electrical signal with respect to a period between two considered times. For example, for each two consecutive data points of the electrical signal the change of the electrical signal is determined and set in relation to the respective present time period, so that for each of the two data points a gradient is determined and a time profile of the gradient of the electrical signal results against the time. The respective data points can refer to a single value or may be already determined averages of several individual values. The gradient can also be called the slope.

The term "instantaneous value" is in particular an instantaneous value in this description. In particular, this is a value of the gradient of the electrical signal at a given time, wherein a time dependence of the gradient is used as the basis.

The proposed method allows any undesirable vibrations of the actuator to be identified on the basis of the current consumption of the actuator. The method also allows that the current consumption of the actuator alone is used for the identification of such vibrations. In this respect, additional sensors can be saved.

Through the method, such undesirable vibrations can be identified which are noticeable as vibration on the actuator. The term "vibration" is to be understood in particular as a periodic vibration, which has such a high frequency that the vibration is audible and/or perceptible. Such vibrations may occur in the actuator due to existing signs of wear.

It has been shown that these vibrations occur especially shortly after switching on the actuator, especially when the actuator is started at a low temperature or when the actuator is operated at a low temperature. It has also been shown that these vibrations occur especially on the motor shaft or the output shaft of the actuator and can have a frequency of about 2 to 2.5 kilohertz (kHz), so that they are then perceived as squeaking or whistling. It has also been shown that these wear-related vibrations can go so far as to impair the function of the electromechanical brake. For example, there may be a reduced clamping force, so that in the worst case the required minimum clamping force is no longer possible. There may also be a reduced gap. In this case, for example, the electromechanical brake is no longer fully opened after a braking process.

In experiments it was found that the undesirable vibrations are noticeable in the current consumption of the actuator, for example, by oscillations also occurring in the time profile of the current consumption. These oscillations in the current consumption can be detected by the method and thus conclusions can be drawn regarding oscillations or vibrations of the actuator.

It has been shown that the identification of any undesirable vibrations is beneficial if, for example, the amount of the threshold has a value between 40 amperes per second (A/s) and 60 A/s or exactly 50 A/s or 50 A/s. For example, the threshold is predetermined or specified, in particular determined empirically. For example, the threshold refers to such an electrical signal that is unfiltered or at least largely unfiltered.

It has also been shown that any peaks in the electrical signal, which are caused by switching on the actuator, are present throughout at each switch-on, and make the detection of undesirable vibrations difficult. It was found that these peaks are not taken into account in the method, or at least are largely disregarded, if the delay time has, for example, a value of 50 milliseconds (ms) and 100 ms, in particular about 80 ms or exactly 80 ms. For example, the delay time is predetermined or specified, in particular determined empirically.

If an undesirable vibration has been assessed as detected, for example, the operation of the actuator is stopped and/or an error signal, in particular an error message, may, but not necessarily, be generated. As a result it can be avoided that any signs of wear on the actuator, which are already noticeable by the undesirable vibrations, have such an effect that the minimum clamping force of the electromechanical brake or a sufficient opening or complete opening of the electromechanical brake after a braking process is no longer achieved. The error message allows the driver of the motor vehicle to be informed at an early stage and to drive to a garage before the malfunctions of the electromechanical brake described above occur.

According to one embodiment, it is further checked whether (iii) the second instantaneous value follows the first instantaneous value in time within a specified period of time and/or whether the amount of the second instantaneous value exceeds the amount of the threshold. It has been shown that this can be used to better identify any undesirable vibrations. This is especially the case if the specified time is between 0.03 seconds and 0.2 seconds, for example between 0.05 seconds and 0.1 seconds. In this embodiment, it is therefore appropriate that the evaluation of the test is carried out in such a way that an undesirable vibration is assessed as detected if the criteria i), ii) and iii) are met.

According to a further embodiment, it is provided that a test process shall be considered positive if at least the criteria (i) and (ii) of a continuous test are met and the test processes assessed as positive are counted. Where criterion (iii) described above is also an integral part of the test, a test process shall be assessed as positive if the criteria (i), (ii) and (iii) of a continuous test are met and the test procedures assessed as positive are counted. In particular, counting is carried out over an actuation process of the electromechanical brake and/or over a period of time after switching on the actuator until its shutdown. In principle, counting can also take place over a predetermined period of time after switching on the actuator. This measure also aims to improve the identification of any undesirable vibrations of the actuator.

In particular, the operation of the actuator is stopped and/or an error signal or an error message may, but not necessarily, be generated when the number of test processes assessed as positive reaches a maximum value. For example, the maximum value is predetermined. For example, the maximum value is determined empirically. As a result, it can be avoided that any signs of wear on the actuator, which are already noticeable by the undesirable vibrations, have such an effect that the minimum clamping force of the electromechanical brake or a sufficient opening or complete opening of the electromechanical brake after a braking process is no longer achieved. The error message allows the driver of the motor vehicle to be informed at an early stage and to drive to a garage before the above-described malfunctions of the electromechanical brake occur.

According to one aspect, the present disclosure further includes an electronically controlled braking system for a motor vehicle. In particular, the electronically controlled braking system is designed to perform the method described above. The electronically controlled braking system has an electromechanical brake. The electromechanical brake has an actuator for clamping and/or opening the electromechanical brake. An actuator motor can be assigned to the actuator. An actuator motor can also form the actuator. In particular, the actuator or actuator motor is designed to produce a rotating motion. For this purpose, the actuator or actuator motor, for example, has an output shaft. In principle, the actuator or actuator motor can also be designed to generate a translational movement. In particular, the electromechanical brake comprises at least one actuating piston actuatable by the actuator or actuator motor, by means of which a brake jaw can be actuated while exerting a braking force.

The braking system also includes an electronic control unit for controlling the actuator or actuator motor. In particular, the electrical control unit has a signal connection to the actuator or actuator motor via at least one control line. The control unit may be hardware and/or software-related, for example as a computer program or a computer program module or may be part of hardware and/or software. The control unit may be part of an electronically controlled assistance system for the motor vehicle, which is present in a motor vehicle, for example. For example, the control unit is part of an anti-lock braking system (ABS) or a driving dynamics control system (ESC) of the motor vehicle or for the motor vehicle. This favors cost advantages, as the affected components then have multiple functions or multiple usage.

In one embodiment, the control unit is set up to provide an electrical signal, which includes at least one piece of information about a current consumption of the actuator and/or the actuator motor or a parameter correlated with the current consumption. In a further embodiment, the control unit is set up to monitor an operation of the actuator and/or the actuator motor on the basis of the gradient of the electrical signal so that preferably continuous testing is carried out as to whether i) the amount of a first instantaneous value of the gradient exceeds the amount of a threshold and (ii) a subsequent second instantaneous value of the gradient has an inverted sign compared to the first instantaneous value. In particular, the control unit is further set up to carry out this test only after switching on the actuator or actuator motor and, if necessary, after a subsequent delay time. In particular, the control unit is also set up to assess an undesirable vibration as detected if at least the criteria (i) and (ii) are met.

In particular, the threshold is specified. For example, at least one value for the threshold is stored in a memory of the control unit. In particular, the delay time is predetermined. For example, at least one delay time value is stored in the memory or a memory of the control unit.

In a further embodiment, the control unit is set up to check, preferably continuously, whether iii) the second instantaneous value follows the first instantaneous value in time within a predetermined time period and/or whether the amount of the second instantaneous value exceeds the amount of the threshold. In particular, the control unit is set up to assess an undesirable vibration as detected if the criteria (i), (ii) and (iii) are met.

In the case of a further embodiment, the control unit is set up to evaluate a test process as positive if at least the criteria (i) and (ii) of a continuous test are met and to count the test processes which are assessed as positive. In particular, the control unit is also set up to stop the operation of the actuator and/or to generate an error message when the number of test processes assessed as positive reaches a predetermined maximum value. For example, at least one value for the maximum value is stored in the memory or a memory of the control unit.

Where the control unit is set up to include the above criterion (iii) in the test, a test procedure shall be assessed as positive if the criteria (i), (ii) and (iii) of a continuous test are met. In particular, the control unit is set up to carry out the counting over an actuation of the electromechanical brake and/or over a period of time after switching on the actuator until it is switched off.

The electromechanical brake may be set up to perform a parking brake function. The term "parking brake function" means in the present description, in particular, a function by which a vehicle equipped with the brake is kept at a standstill when parking braking has been carried out. The aim is to prevent the vehicle from rolling away unintentionally, even if the vehicle is on an inclined road. The parking braking process is also to be described as parking braking. In the present description, the term "holding braking function" is used as a synonym for "parking braking function". The holding braking function or parking braking function can also be used for emergency braking of the vehicle. The parking braking function or the holding braking function therefore also implies an emergency braking function.

The electronically controlled braking system is set up in particular to perform the above-described method for detecting undesirable vibrations of the actuator or actuator motor of the electromechanical brake. In this respect, the electronically controlled braking system can be used to achieve the beneficial effects already described above for the method. The threshold or maximum value for the electronically controlled braking system may be the threshold or maximum value already described above in relation to the method. The same applies to the delay time specified for the electronically controlled braking system.

According to a further aspect, the present disclosure relates to a computer program product with a program code for carrying out the above-described method stored on a medium readable by a computer.

According to a further aspect, the present disclosure relates to a control unit, in particular for the electronically controlled braking system described above, comprising the computer program product described above. The control unit may be the control unit of the electronically controlled braking system described above.

The term "control unit" in the present description means in particular an electronic unit of computer hardware which controls certain processes and/or sequences of events in connection with the electronically controlled braking system, in particular the electromechanical brake. The control unit may have a digital processing unit, such as a microprocessor unit (CPU). The CPU may have a data and/or signal connection to a memory system and/or a bus system. The control unit may have one or more programs or program modules.

The digital processing unit may be designed in such a way that commands that are implemented as a program stored in a memory system are processed, input signals are received from a data bus system and/or output signals are transmitted to a data bus system. A memory system may have one or more memory media, especially different ones. The memory media may be in particular optical, magnetic, solid-state memory media and/or other, preferably non-volatile memory media.

According to a further aspect of the present disclosure, a motor vehicle with the electronically controlled braking system described above and/or the computer program product described above and/or the control unit described above is provided.

BRIEF DESCRIPTION OF THE DRAWINGS

Further details and features of the present disclosure can be obtained from the following description of at least one exemplary embodiment based on the drawings. In the figures.

DETAILED DESCRIPTION

Figure 1:
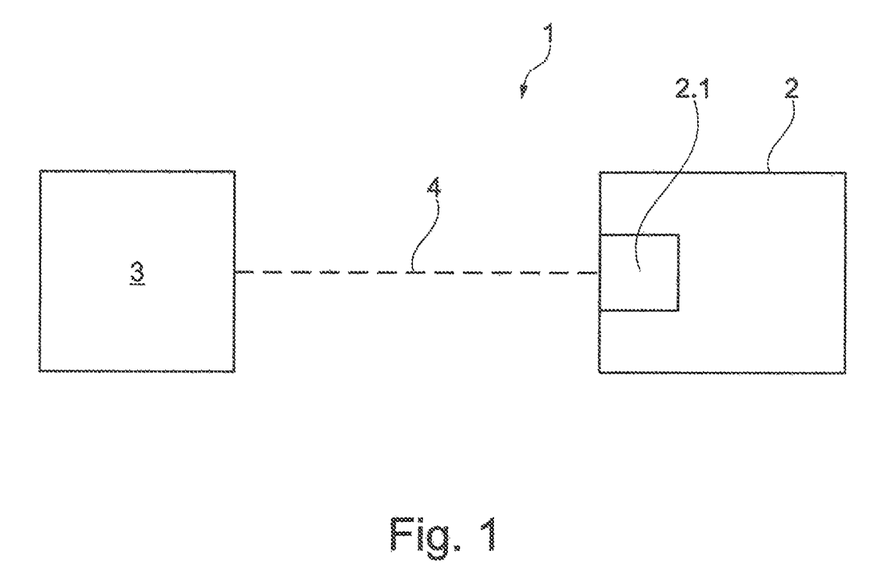
FIG. 1 shows a possible embodiment of an electronically controlled braking system with an actuator for clamping or opening an electromechanical brake in a schematized representation.

FIG. 1 shows—in a schematized representation—a possible embodiment of an electronically controlled braking system 1, which can be used in a motor vehicle, for example. The electronically controlled braking system 1 can have a parking brake function. For example, the electronically controlled braking system 1 is part of an electrical parking brake (EPB).

The electronically controlled braking system 1 comprises an electromechanical brake 2, to which an actuator 2.1 is assigned for damping or opening the electromechanical brake 2. Preferably, the actuator 2.1 comprises an actuator motor (not shown in FIG. 1) or consists of the actuator motor. The electronically controlled braking system 1 further comprises an electrical control unit 3 for controlling the actuator 2.1 or actuator motor. Preferably, the electrical control unit 3 and the electromechanical brake 2, in particular the electromechanical control unit 3 and the actuator 2.1 or actuator motor are electrically connected to each other, in particular electrically connected for signaling, via at least one control line 4 or actuation line in order to control the actuator 2.1 or actuator motor, for example.

Preferably, the actuator motor is an electrical motor, in particular a DC motor. For example, the electromechanical brake 2 comprises at least one actuator piston actuated by the actuator motor, by which a brake jaw can be operated with the exertion of a braking force or clamping force.

The electrical control unit 3 may be a control unit of an electronically controlled assistance system for the motor vehicle, which is already present in the motor vehicle, for example, and is additionally used for the electronically controlled braking system 1. For example, the control unit 3 is a component of an anti-lock braking system (ABS) or a driving dynamics control system (ESC) of the motor vehicle.

Preferably, the control unit 3 is an electronic unit of computer hardware, which controls certain processes and/or sequences of events in connection with the electronically controlled braking system 1. Preferably, the control unit 3 comprises a digital processing unit, which includes a microprocessor unit, for example. The microprocessor unit, in turn, may have a data/signal connection to a memory system and/or bus system. Preferably, the control unit 3 comprises at least one, preferably multiple programs or program modules, in which operations and/or processes are implemented.

The electronically controlled braking system 1 is, for example, designed to perform a method for detecting undesirable vibrations of the actuator 2.1 or actuator motor. Such vibrations are, for example, vibrations due to wear, which are acoustically noticeable in the operation of the actuator 2.1 by a squeaking or whistling. These vibrations occur especially during low-temperature operation, for example shortly after switching on the actuator 2.1. The undesirable vibrations are also manifested in the profile of the current consumption of the actuator 2.1 or the actuator motor, as can be seen from FIGS. 2 and 3.

Figure 2:
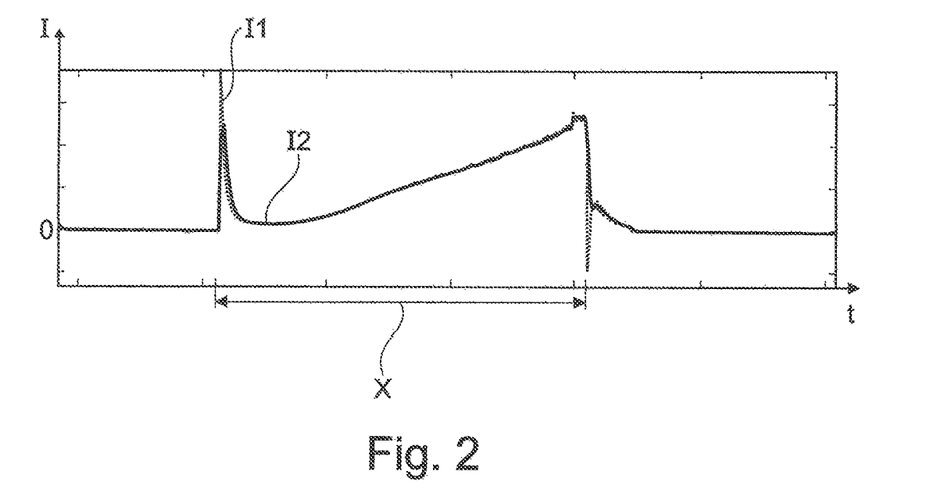
FIG. 2 shows a possible time profile of the current consumption of the actuator of the electronically controlled braking system of FIG. 1 during a clamping process without vibrations occurring on the actuator.

FIG. 2 shows by way of example a profile of the electrical current strength I of the actuator 2.1 or the actuator motor against time t, wherein besides the profile of the unfiltered current signal 11, the profile of a filtered current signal 12 is also visible. A time period X is also shown there, which relates to a damping process of the electromechanical brake 2 and shows the profile of the electrical current strength I over this period X. For example, the time period X begins with the switching on of the actuator 2.1 and, for example, the time period X ends with the switching off of the actuator 2.1, because a desired damping force has been achieved. In FIG. 2, the profile of the electrical current strength I is shown over the time period X when the actuator 2.1 or the actuator motor is working properly, in particular no undesirable vibrations occur.

Figure 3:
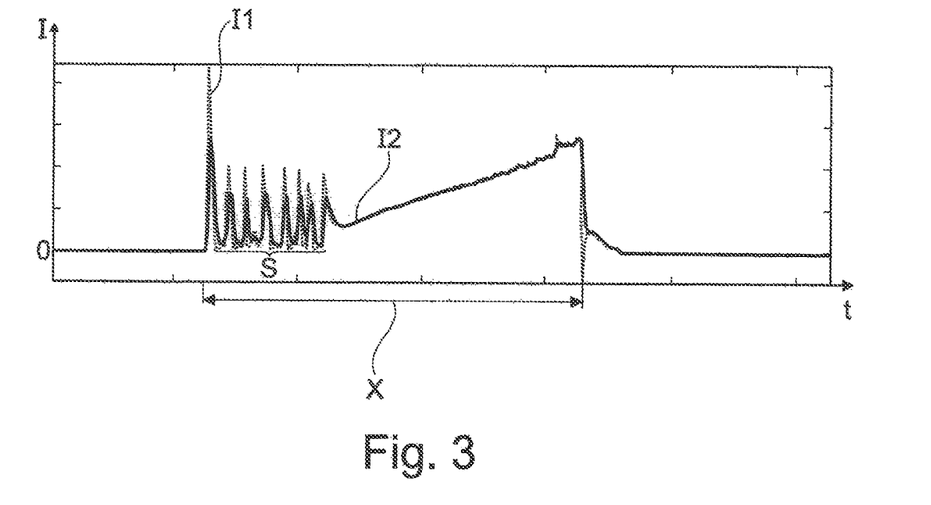
FIG. 3 shows a possible time profile of the current consumption of the actuator of the electronically controlled braking system of FIG. 1 during a clamping process with vibrations occurring on the actuator.

In comparison, FIG. 3 shows by way of example a profile of the electrical current strength I of the actuator 2.1 or the actuator motor against the time t, during which unwanted vibrations occur on the actuator 2.1, in particular on the motor shaft of the actuator. In FIG. 3, the period X can also be seen, as already described for FIG. 2. As can be seen from FIG. 3, oscillations S, which are not present in FIG. 2 for example, occur over a certain duration in the time profile of the current strength I. These oscillations S are, for example, higher frequency and begin after switching on the actuator 2.1, in particular immediately after switching on the actuator 2.1 and end, for example, in the course of a build-up of the damping force of the electromechanical brake 2, thus when the electrical current strength I is rising continuously or substantially continuously. It has been shown that these oscillations S in the time profile of the electrical current strength I of the actuator 2.1 go hand in hand with the undesirable vibrations of the actuator 2.1 described above.

In the method for detecting such undesirable vibrations, these findings on the behavior of the electrical current strength I of the actuator 2.1 are used. Preferably, therefore, the control unit 3 is set up to provide an electrical signal, which includes at least one piece of information about a current consumption of the actuator 2.1 or a parameter correlated with the current consumption.

In order to identify any undesirable vibrations, the control unit 3 is further set up in particular to monitor an operation of the actuator 2.1 on the basis of the gradient of the electrical signal. Preferably, for this purpose the control unit 3 is set up to continuously check whether (i) the amount of a first instantaneous value of the gradient exceeds the amount of a threshold and whether (ii) a subsequent second instantaneous value of the gradient has an inverted sign compared to the first instantaneous value. Preferably, the control unit 3 is further set up to evaluate an undesirable vibration as detected if at least the criteria (i) and (ii) are met.

Preferably, the control unit 3 is set up to also check whether iii) within a given time period the second instantaneous value follows the first instantaneous value in time and/or whether the amount of the second instantaneous value exceeds the amount of the threshold. In this respect, the control unit 3 is also set up to assess an undesirable vibration as detected if the criteria (i), (ii) and (iii) are met.

In order to allow increased reliability in detecting the undesirable vibrations, the control unit is set up to take into account several test cycles, for example during an actuation of the electromechanical brake 2, before an assessment is carried out. Preferably, the control unit 3 is set up to evaluate a test process as positive if at least the criteria (i) and (ii) or the criteria (i), (ii) and (iii) of a continuous test are met and the test processes assessed as positive are counted. Preferably, the control unit 3 is further set up to stop the operation of the actuator 2.1 and/or to generate an error message when the number of test processes assessed as positive reaches a maximum value, in particular a predetermined maximum value.

Preferably, the control unit 3 is assigned a low-pass filter (not shown in FIG. 1), which is set up to filter the electrical signal so that the filtered electrical signal is used for the gradient considered (see FIG. 2). Preferably, the low-pass filter has a blocking frequency. For example, the blocking frequency is between 20 Hertz and 30 Hertz, in particular 25 Hertz or essentially 25 Hertz.

A possible manner of operation of the electronically controlled braking system 1 is explained below on the basis of FIGS. 4*a*, 4*b* and 4*c:*

Figure 4A:
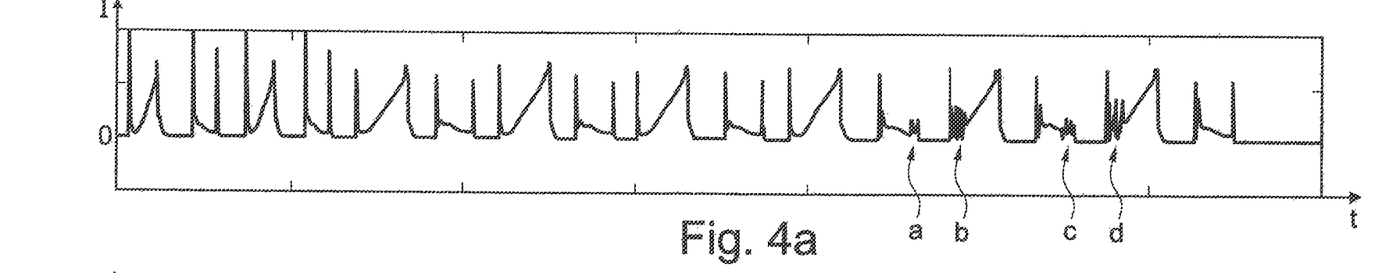
FIG. 4A shows a possible time profile of the current consumption of the actuator of the electronically controlled braking system of FIG. 1 over a number of actuation cycles of the actuator.
Figure 4B:
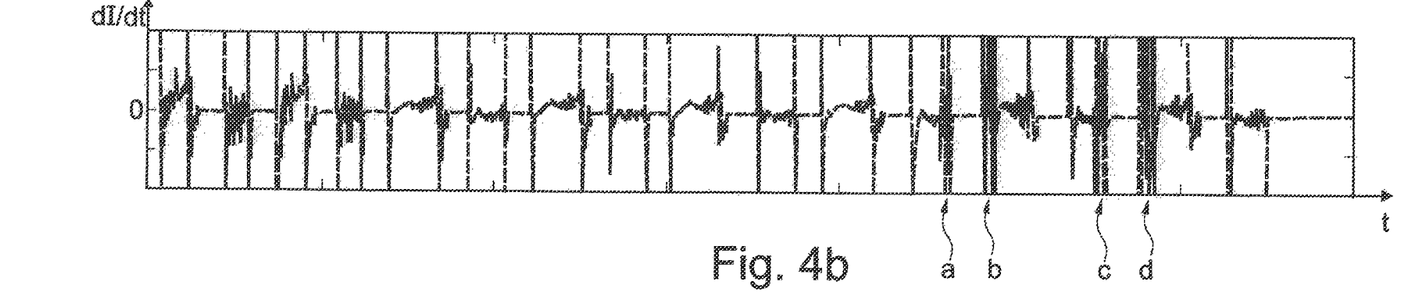
FIG. 4B shows the current signal of FIG. 4A in a time profile of its derivative against time and FIG. 4C shows the detection of undesirable vibrations during the actuation cycles considered in FIG. 4A by the braking system according to FIG. 1, shown in a time profile of a jump function.
Figure 4C:
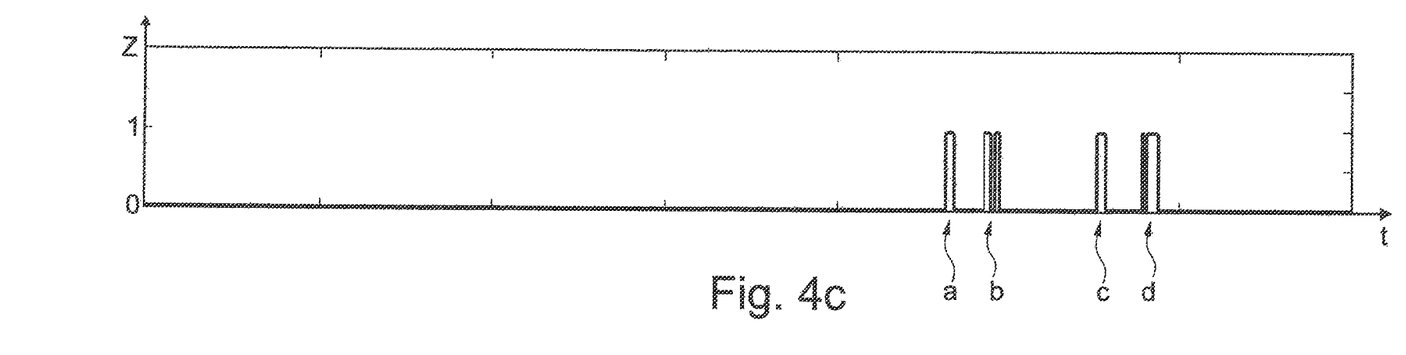

FIG. 4*a* shows by way of example a time profile of the electrical current strength I in relation to a low-pass filtered current, when the electromechanical brake 2 passes through a variety of clamping-opening cycles. For example, a cycle involves a process of clamping the electromechanical brake 2 and a process of subsequent opening of the electromechanical brake 2. For example, a particular process starts with the switch-on of the actuator 2.1 or the actuator motor. For example, a particular operation ends with the actuator 2.1 or the actuator motor being switched off.

As can be seen from FIG. 4*a*, individual cycles show a change in the profile of the electrical current strength I over a respective period of time a, b, c, d. During these periods a, b, c, d, the time profile of the electrical current strength I has additional oscillations, in particular higher frequency oscillations, which are due to undesirable vibrations of the actuator 2.1 occurring.

By means of the control unit 3, an electrical signal can be provided, which includes a piece of information about these current values as the current consumption of the actuator 2.1 or the actuator motor. By means of the control unit 3, the operation of the actuator 2.1 can be monitored on the basis of the gradient of the electrical signal. In order to illustrate the effect of gradient formation, in FIG. 4B the current signal of FIG. 4A is shown in a time profile of its derivative dI/dt against time t. The time periods a, b, c, d already recognized in the time profile of the electrical current strength I (FIG. 4A) are also to be recognized in the time profile of the gradient or the differentiated electrical current or the differentiated electrical signal of FIG. 4B.

Preferably, by means of the control unit 3, the monitoring of the operation of the actuator 2.1 is carried out in such a way that it is continuously checked whether the amount of a first instantaneous value of the gradient exceeds the amount of a preferably predetermined threshold and whether a subsequent second instantaneous value of the gradient has an inverted sign compared to the first instantaneous value. Preferably, the check begins each time after switching on the actuator 2.1 and preferably after a subsequent delay time. Preferably, the delay time is predetermined. Preferably, the check ends before switching off the actuator 2.1. Preferably, in the course of the check it is also checked whether within a preferably predetermined duration the second instantaneous value follows the first instantaneous value in time and/or whether the amount of the second instantaneous value exceeds the amount of the threshold.

The control unit 3 preferably carries out a continuous evaluation of the results of the continuous checks. As soon as a check shows that the above test criteria are met, an undesirable vibration is assessed as detected by means of the control unit 3. The control unit 3 may have a counter Z (FIG. 4C) for this purpose, which is set to the value zero, for example, as long as the checks show that at least one of the above test criteria is not met during an actuation of the actuator 2.1. For example, the control unit 3 sets the counter to the value one as soon as a check shows that all test criteria are met. Preferably, the control unit 3 then causes that the operation of the actuator 2.1 is stopped and/or an error message is generated, in particular is output. Preferably, the control unit 3 is set up in such a way that the counter is reset back to the value zero in the course of a respective switching off of the actuator 2.1. In FIG. 4C, the behavior of the control unit 3 is shown in an exemplary manner on the basis of the time profile of a jump function shown there.

The time periods a, b, c, d detected in the profile of the electrical current strength I (FIG. 4A) were recognized by the method as time periods with undesirable oscillations or vibrations on the actuator 2.1. The counter Z has been set to the value one in the time periods a, b, c, d.

During the check it may also be the procedure that a test process is assessed as positive if all the test criteria are met in the case of a completed test and the test processes assessed as positive are counted. In this case, for example, operation of the actuator 2.1 is stopped and/or an error message is generated when the number of test processes assessed as positive reaches a predetermined maximum value over an actuation process of the electromechanical brake 2.

In the case of the key values for the ranges mentioned in this description, in particular the key values themselves for the respective range are included. Also, the named ranges include any individual values contained therein.

In the present description, the reference to a particular aspect or embodiment or design means that a particular feature or property described in connection with the respective aspect or embodiment or design is at least contained therein, but does not necessarily have to be contained in all aspects or embodiments or designs of the present disclosure. It is expressly pointed out that any combination of the various features and/or structures and/or properties described in relation to the present disclosure is covered by the present disclosure unless this is expressly refuted or is unambiguously refuted by the context.

The use of individual or all examples or an exemplary expression in the text is intended only to illuminate the present disclosure and does not constitute a limitation with regard to the scope of the present disclosure unless otherwise claimed. Nor is any expression or formulation of the description to be understood in such a way that it is an unclaimed element which is essential for the practice of the present disclosure.

What is claimed is:

1. A method for detecting undesirable vibrations of an actuator of an electromechanical brake, including the following steps:
   providing an electrical signal comprising at least one piece of information about a current consumption of the actuator or a parameter correlated with the current consumption;
   monitoring an operation of the actuator on the basis of the gradient of the electrical signal in such a way that after switching on the actuator and after a subsequent delay time, including determining whether the amount of an initial instantaneous value of the gradient exceeds the amount of a threshold, and determining whether a subsequent second instantaneous value of the gradient has an inverted sign compared to the first instantaneous value; and
   evaluating results from monitoring the operation to ensure that an undesirable vibration is assessed as detected if the amount of the initial instantaneous value of the gradient exceeds the amount of a threshold and the subsequent second instantaneous value of the gradient has an inverted sign compared to the first instantaneous value.

2. The method as defined in claim 1, further comprising the step of:
   determining whether the second instantaneous value follows the first instantaneous value in time within a given period of time.

3. The method as defined in claim 2, wherein the specified time duration has a value between 0.03 seconds and 0.2 seconds.

4. The method as defined in claim 3, further comprising the step of:
   determining whether the amount of the second instantaneous value exceeds the amount of the threshold.

5. The method as claimed any claim 4, wherein the step of evaluating results is carried out in such a way that the undesirable vibration is assessed as detected if the amount of the initial instantaneous value of the gradient exceeds the amount of a threshold; the subsequent second instantaneous value of the gradient has an inverted sign compared to the first instantaneous value; and the amount of the second instantaneous value exceeds the amount of the threshold.

6. The method as defined in claim 5, further comprising the step of:
assessing a positive result for a test process if, during a continuous test, the amount of the initial instantaneous value of the gradient exceeds the amount of a threshold and the subsequent second instantaneous value of the gradient has an inverted sign compared to the first instantaneous value;
counting the positive result; and
stopping the operation of the actuator and/or generating an error message when the number of test processes assessed as positive reaches a maximum value.

7. The method as defined in claim 5, further comprising the step of:
assessing a positive result for a test process if, during a continuous test, the amount of the initial instantaneous value of the gradient exceeds the amount of a threshold; the subsequent second instantaneous value of the gradient has an inverted sign compared to the first instantaneous value; and the amount of the second instantaneous value exceeds the amount of the threshold;
counting the positive result; and
stopping the operation of the actuator and/or generating an error message when the number of test processes assessed as positive reaches a maximum value.

8. The method as defined in claim 7, wherein the threshold is predetermined, and the amount of the threshold has a value between 40 A/s and 60 A/s.

9. The method as defined in claim 8, wherein the delay time is predetermined and has a value between 50 ms and 100 ms.

10. An electronically controlled braking system for a motor vehicle, comprising: an electromechanical brake with an actuator for clamping and/or opening the electromechanical brake;
a control unit for controlling the actuator, the control unit being configured to provide an electrical signal comprising at least one piece of information about a current consumption of the actuator or a parameter correlated with the current consumption, the control unit being configured to monitor an operation of the actuator on the basis of the gradient of the electrical signal in order to check whether the amount of a first instantaneous value of the gradient exceeds the amount of a threshold, and a subsequent second instantaneous value of the gradient has an inverted sign compared to the first instantaneous value;
wherein the control unit assesses an undesirable vibration as detected if the amount of the initial instantaneous value of the gradient exceeds the amount of a threshold and the subsequent second instantaneous value of the gradient has an inverted sign compared to the first instantaneous value.

11. The braking system as defined in claim 10, wherein the control unit is configured to determine whether the second instantaneous value follows the first instantaneous value in time within a specified period of time, and/or whether the amount of the second instantaneous value exceeds the amount of the threshold;
and wherein the control unit is also configured to assess an undesirable vibration as detected if the amount of the initial instantaneous value of the gradient exceeds the amount of a threshold; the subsequent second instantaneous value of the gradient has an inverted sign compared to the first instantaneous value; and the amount of the second instantaneous value exceeds the amount of the threshold.

12. The braking system as defined in claim 10, wherein the control is configured to evaluate a test process as positive if the amount of the initial instantaneous value of the gradient exceeds the amount of a threshold; the subsequent second instantaneous value of the gradient has an inverted sign compared to the first instantaneous value, and
wherein the control is also configured to count the test processes assessed as positive and configured to stop the operation of the actuator and/or generate an error message when the number of test processes assessed as positive reaches a predetermined maximum value.

13. The braking system as defined in claim 11, wherein the control unit is set up to evaluate a test process as positive if the amount of the initial instantaneous value of the gradient exceeds the amount of a threshold; the subsequent second instantaneous value of the gradient has an inverted sign compared to the first instantaneous value; and the amount of the second instantaneous value exceeds the amount of the threshold;
and wherein the control unit is also configured to count the test processes assessed as positive and configured to stop the operation of the actuator and/or generate an error message when the number of test processes assessed as positive reaches a specified maximum value.

* * * * *